(12) United States Patent
Meyer et al.

(10) Patent No.: US 12,291,074 B2
(45) Date of Patent: May 6, 2025

(54) SPRING LINK

(71) Applicant: BENTELER AUTOMOBILTECHNIK GMBH, Paderborn (DE)

(72) Inventors: Stephan Meyer, Bielefeld (DE); Oliver Mielke, Altenbeken (DE); Dirk Vogler, Delbrueck (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/385,574

(22) Filed: Oct. 31, 2023

(65) Prior Publication Data
US 2024/0140157 A1    May 2, 2024

(30) Foreign Application Priority Data

Oct. 31, 2022 (EP) ..................... 22204754

(51) Int. Cl.
*B60G 3/02* (2006.01)
*B60G 7/00* (2006.01)
*B60G 11/14* (2006.01)
*B60G 11/16* (2006.01)

(52) U.S. Cl.
CPC ............... *B60G 3/02* (2013.01); *B60G 11/14* (2013.01); *B60G 2206/121* (2013.01)

(58) Field of Classification Search
CPC .......... B60G 3/02; B60G 7/001; B60G 11/14; B60G 11/16; B60G 2200/4622; B60G 2204/1244; B60G 2206/11; B60G 2206/121; B60G 2206/16;
(Continued)

(56) References Cited

U.S. PATENT DOCUMENTS

| | | |
|---|---|---|
| 2015/0008654 A1 | 1/2015 | Haselhorst et al. |
| 2017/0203624 A1 | 7/2017 | Mielke et al. |
| 2020/0247204 A1 | 8/2020 | Fortmeier et al. |

(Continued)

FOREIGN PATENT DOCUMENTS

| | | | | |
|---|---|---|---|---|
| DE | 10241406 A1 | * | 12/2003 | ............. B60G 7/001 |
| DE | 102004032471 A1 | * | 1/2006 | ............. B60G 7/001 |

(Continued)

OTHER PUBLICATIONS

Extended European Search Report for European Application No. 22204754.0 mailed Mar. 21, 2023; 21pp.

*Primary Examiner* — Jason D Shanske
*Assistant Examiner* — Daniel M. Keck
(74) *Attorney, Agent, or Firm* — HAUPTMAN HAM, LLP

(57) ABSTRACT

A spring link includes a link body which includes two side wall profiles which are parallel to one another at a distance and which are connected by a spring seat plate extending transversely from one side wall profile to the other side wall profile. Each side wall profile includes a side web having an outwardly directed upper collar section which extends in the longitudinal direction of the side web. The spring seat plate rests with a lateral longitudinal edge section on an upper collar section and is joined to the upper collar section. The side wall profiles of the link body are mirror-symmetrical to one another. The lower side of the link body opposite to the spring seat plate is open.

14 Claims, 4 Drawing Sheets

(58) Field of Classification Search
CPC ........ B60G 2206/162; B60G 2206/722; B60G 2206/8102; B60G 2206/82; B60G 2206/8201
See application file for complete search history.

(56) References Cited

U.S. PATENT DOCUMENTS

| | | |
|---|---|---|
| 2020/0298644 A1 | 9/2020 | Abram et al. |
| 2020/0324599 A1 | 10/2020 | Frenzel et al. |

FOREIGN PATENT DOCUMENTS

| | | | |
|---|---|---|---|
| DE | 102008013182 A1 * | 9/2009 | ............. B60G 11/16 |
| DE | 102009042403 A1 | 3/2011 | |
| DE | 102012100719 A1 | 8/2013 | |
| DE | 102013222234 A1 | 4/2015 | |
| DE | 102016100666 A1 | 7/2017 | |
| DE | 102019102493 A1 | 8/2020 | |
| DE | 102019106937 A1 | 9/2020 | |
| DE | 102020007875 A1 | 3/2021 | |
| EP | 3722121 A1 | 10/2020 | |

\* cited by examiner

SPRING LINK

RELATED APPLICATIONS

The present application claims priority of European Application Number 22204754.0 filed Oct. 31, 2022, the disclosure of which is hereby incorporated by reference herein in its entirety.

FIELD

The invention relates to a spring link for a wheel suspension of a motor vehicle having a link body which includes two mutually parallel side wall profiles which are connected by a spring seat plate.

BACKGROUND

Spring links are an embodiment of chassis control arms that are among the components of a wheel suspension. Spring links are also known as suspension links Spring links absorb high radial forces, such as braking and driving forces. In addition, spring links support the weight of a motor vehicle in cooperation with other chassis components.

Spring links include force introduction points for spring and damper forces. Spring/damper elements, such as a shock absorber or a helical compression spring, are supported on a spring link.

Spring links in which the link bodies are designed as formed sheet steel components or shell elements are known from DE 10 2012 100 719 A1 or DE 10 2013 222 234 A1.

Comparable embodiments of spring links are able to be found in DE 10 2016 100 666 A1 or also DE 10 2009 042 403 A1.

As already mentioned in the introduction, spring links have the function of supporting the torques that arise when braking or accelerating and absorbing the forces acting from a spring/damper element. Therefore, very high demands are placed on the rigidity of a spring link. On the other hand, the spring links are to have the lowest possible component weight. On the side of the unsprung wheel masses, a low weight has an advantageous effect on the driving dynamics of a motor vehicle.

In the conflict of objectives between the high rigidity requirements on the one hand and the requirement for the lowest possible weight while at the same time being manufactured efficiently on the other hand, the known designs of spring links do not provide the best conditions.

SUMMARY

The disclosure is based on the object of providing a spring link that is lightweight, cost-effective, and advantageous in terms of production technology and which reliably meets the load requirements, such as the high rigidity requirements.

Embodiments and modifications of features of the spring link according to the disclosure which, individually or in combination, design and/or refine the disclosure in a technically advantageous manner are also able to be found in the description and the accompanying drawings.

A spring link according to the disclosure includes a link body which includes two side wall profiles connected by a spring seat plate that extends transversely from one side wall profile to the other side wall profile. Each side wall profile includes a side web having an outwardly directed upper collar section which extends in the longitudinal direction of the side web. The side wall profiles are arranged below the spring seat plate. The side webs of the side wall profiles are directed vertically from the plane of the spring seat plate. The upper collar section is repositioned outwards away from the vertical central longitudinal plane. The spring seat plate rests with a lateral longitudinal edge section on an upper collar section and is joined to the upper collar section.

The spring seat plate is materially bonded, e.g., welded, to the side wall profiles or the upper collar section of a side wall profile.

Terms such as upper, lower, top, bottom, horizontal, vertical, longitudinal, transverse, or longitudinal and transverse direction as well as upper side and lower side refer to the intended installation position and the orientation of the spring link in the wheel suspension of a motor vehicle.

An outwardly directed collar section means that the collar section is directed transversely outwards from the side web, i.e., away from the vertical central longitudinal plane, in relation to the vertical central longitudinal plane of the link body. The collar sections are directed outwards in the spring link transverse axis (y-axis).

The link body of the spring link according to the disclosure includes three components, namely the two side wall profiles and the upper spring seat plate. The spring seat plate forms the spring seat for a helical compression spring. The spring seat is above the side wall profiles.

The two side wall profiles are arranged parallel to one another at a distance along the spring link transverse axis (y-axis).

The lower side of the link body facing away from the spring seat plate is open. The two side wall profiles are joined to the spring seat plate on the upper side and protrude freely away therefrom.

The components of the link body include steel, e.g., high-strength or higher-strength steel. The components of the link body include a type of steel having the material number 1.0980. This is a higher-strength steel for cold forming that is thermomechanically rolled.

The spring seat plate sits or lies on the side wall profiles. In this way, spring force is introduced above the two side wall profiles. In the spring link according to the disclosure, a high spring seat is implemented, which is arranged above the lateral line of force action.

The side wall profiles include side webs that are oriented perpendicularly or vertically to the spring seat plate. The side webs extend below the spring force introduction.

The weld seams of a materially-bonded joint extend in the tension shadow below the spring seat plate.

The side wall profiles of the link body are designed to be mirror-symmetrical to one another. The side wall profiles are produced as stamped components. This is advantageous in terms of production technology.

The lower side of the link body opposite to the spring seat plate is open. Due to the rational structure of the link body and the functional design of the side wall profiles and the spring seat plate extending transversely between the side wall profiles, a weight-saving design is possible. At the same time, the spring link according to the disclosure meets the highest rigidity requirements and can withstand high loads, both dynamically and statically. The design of the side wall profiles contributes to this.

The upper collar sections each extend over the length of a side wall profile.

In an embodiment according to the disclosure, each side web of a side wall profile includes an outwardly directed lower collar section which extends in the longitudinal direction of the side web. The lower collar section also extends over the length of a side wall profile.

The upper collar section or the lower collar section are able to have a curved edge contour. The width of the lower collar section is able to vary over its length. Mounting openings for fastening a protective element, e.g., a stone chip protection, are provided in the lower collar sections. In this embodiment, a lower collar section has, in addition to the function of increasing the rigidity of a side wall profile, the function of a flange for fastening a stone chip protection.

The upper collar section and the lower collar section of a side wall profile merge into one another at a first front end of the side wall profile via an arced collar section. In this way, the side wall profile is provided along the upper side edge and along the lower side edge both at the front end with a circumferential collar section that is repositioned to the outside. Only the second front end is collarless. The upper collar section, the lower collar section, and the arced front collar section connecting the upper collar section and the lower collar section form a circumferential outwardly directed edge on three side edges of a side wall profile. The side wall profiles having the three-sided continuously repositioned edge contributes to the advantageous rigidity behavior of the spring link.

The longitudinal edge sections of the spring seat plate protrude laterally outwards over the upper collar sections.

The rigidity behavior is able to be improved by profiling the side wall profiles; e.g., openings and bearing receptacles are also able to include circumferential collars or collar sections that are directed outwards.

The openings and bearing receptacles provided with collars are designed like passages in the side webs of the side wall profiles.

Advantageously, the upper collar sections and the lower collar sections as well as the arced collar sections extending on the front side as well as the collars or collar sections on bearing receptacles and openings all point outwards in the same direction. The collars and collar sections are directed outwards from the vertical central longitudinal plane of the link body.

According to the disclosure, each side wall profile includes a first end section and a second end section. In at least one end section, such as in the first end section of each side wall profile, a bead is provided, which is formed in the transition from the upper collar section to the side web. The bead extends triangularly in the side web. The bead is shaped directed downwards and extends approximately to the middle of a side web.

Furthermore, the spring seat plate has a bulge that protrudes relative to a spring support surface. The bulge protrudes upwards in relation to the spring seat surface and the side wall profiles. The bulge is used for positional orientation, such as for centering a helical compression spring.

A further advantageous embodiment provides that the spring seat plate includes an arced contoured recess in an end face extending transversely between the side wall profiles. In this way, the weight is able to be further reduced. In addition, the recesses are used as clearance and ensure accessibility to bearing receptacles and/or connection points or also the passage of other components of the wheel suspension.

At least one embodiment provides that a non-round, e.g., a polygonal, opening is provided in each first end section of a side wall profile. The non-round openings in the two side walls are aligned coaxially with one another and are configured and intended to cooperate with an eccentric adjustment device. The spring link is able to be aligned relative to the connection on the wheel carrier side via the eccentric adjustment device, which includes eccentric elements such as eccentric disks or eccentric screws and/or control elements. In this way, the track and/or camber of a motor vehicle is also able to be adjusted.

In at least one embodiment, two openings are provided in the first end section on the wheel carrier side, which are part of the eccentric adjustment device. An elongated hole and a non-round opening having a trapezoidal configuration are arranged in every second longitudinal section. The elongated hole has a longitudinal axis which is oriented in the longitudinal direction of a side wall profile. The vertical axis of the trapezoidal non-round opening is longer than the transverse axis. The transverse axis extends in the longitudinal direction of the side wall profiles. The vertical axis is aligned perpendicular thereto.

An edge stop is provided on a non-round opening, e.g., on a polygonal opening or the non-round opening having a trapezoidal configuration. The edge stop functions as a control track for an adjusting element of the eccentric adjustment device.

The stop is formed by a circumferential collar on the non-round opening having a trapezoidal configuration. The collar is directed outward.

BRIEF DESCRIPTION OF THE DRAWINGS

The invention is described in more detail hereinafter on the basis of exemplary embodiments illustrated in the drawings. In the figures.

DETAILED DESCRIPTION

Figure 1:
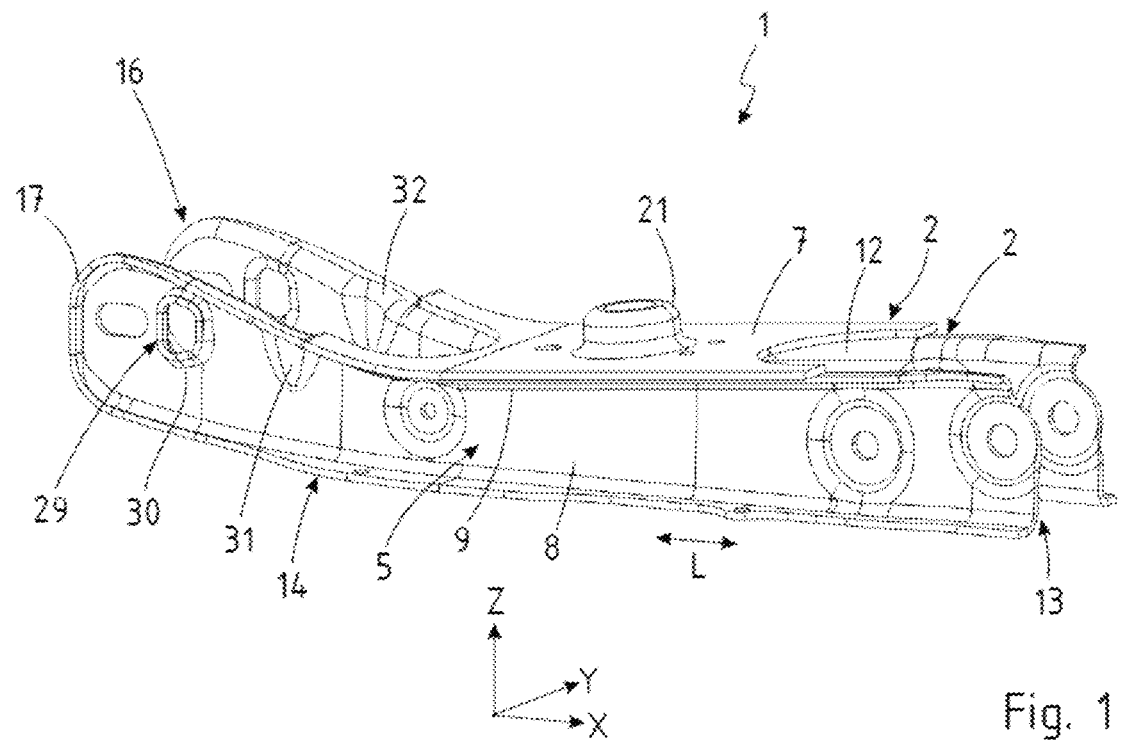
FIG. 1 shows a spring link according to the invention in a perspective view.
Figure 2:
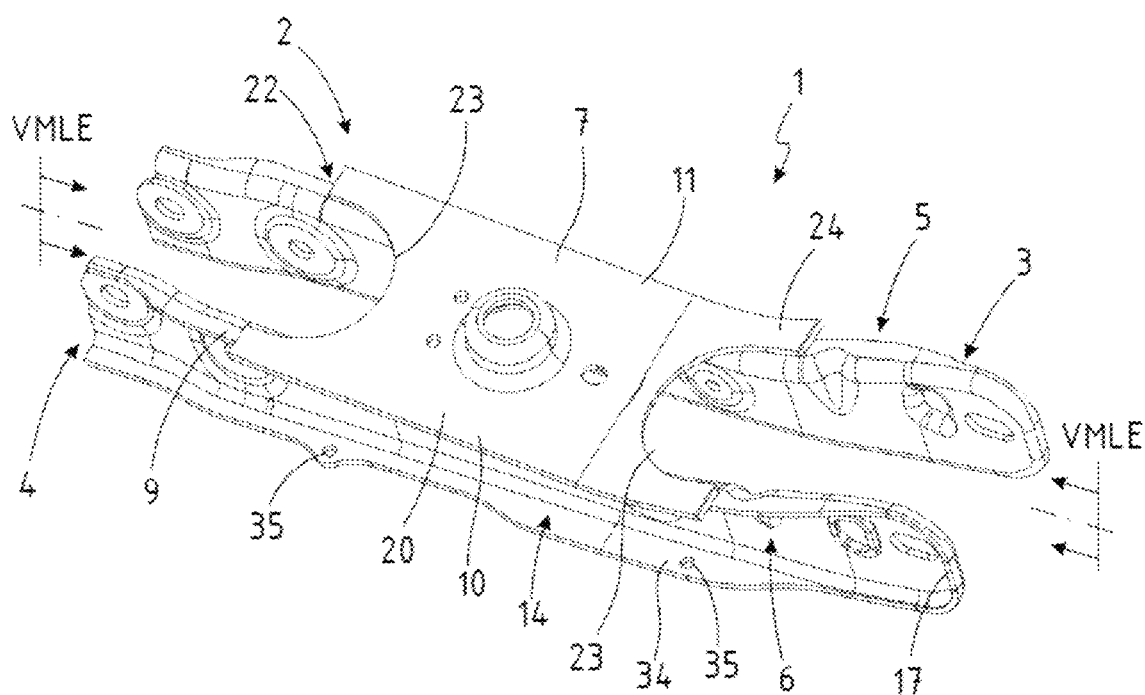
FIG. 2 shows the spring link as shown in FIG. 1 in a perspective obliquely from above.
Figure 3:
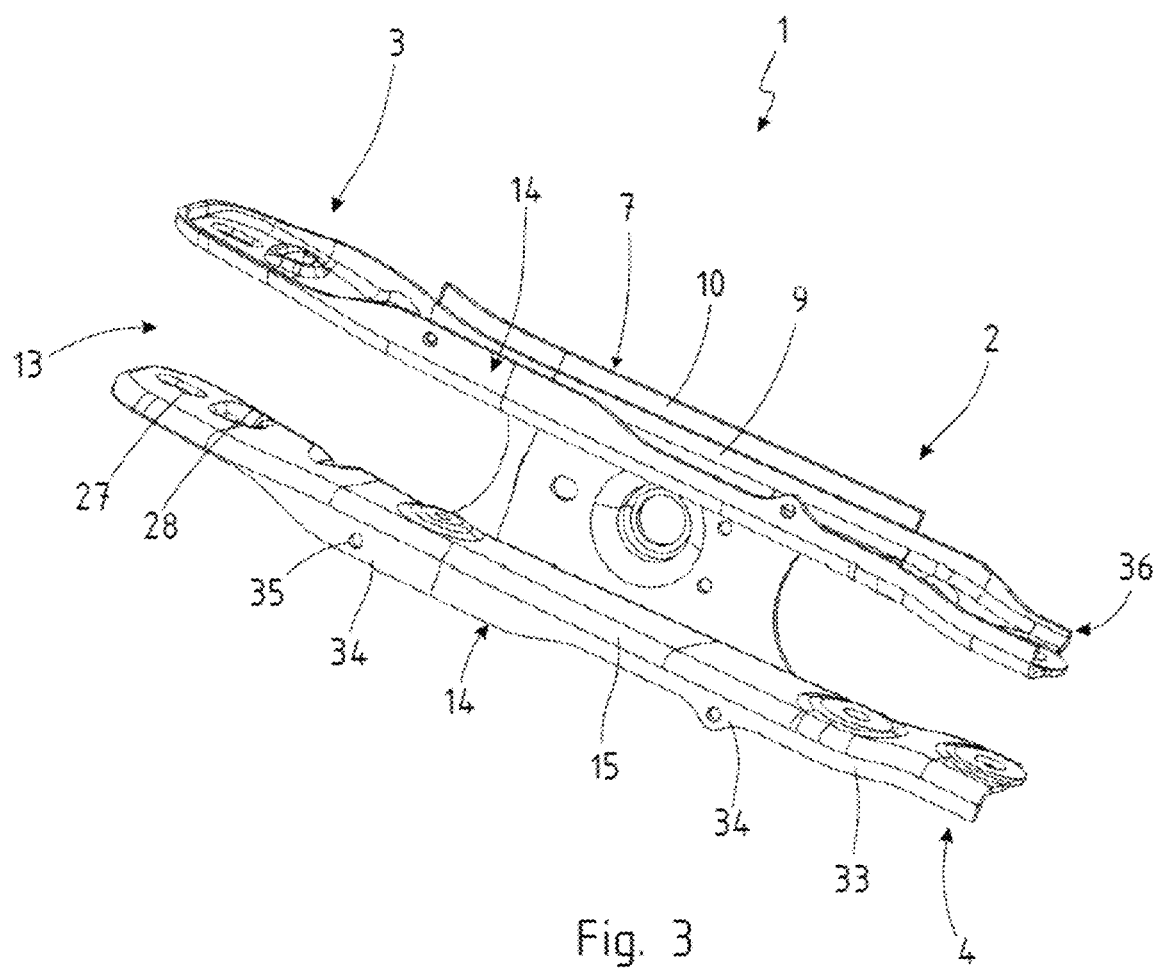
FIG. 3 shows the spring link in a perspective view from below.
Figure 4:
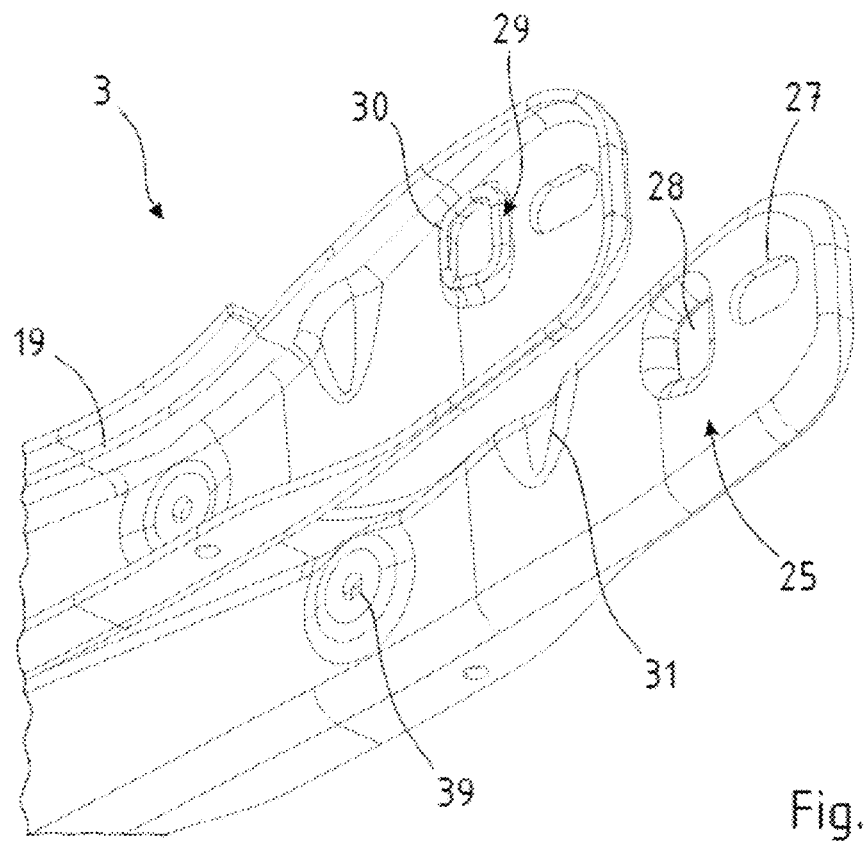
FIG. 4 shows a section of the link body of the spring link with the representation of a bearing section of the link body on the wheel carrier side.
Figure 5:
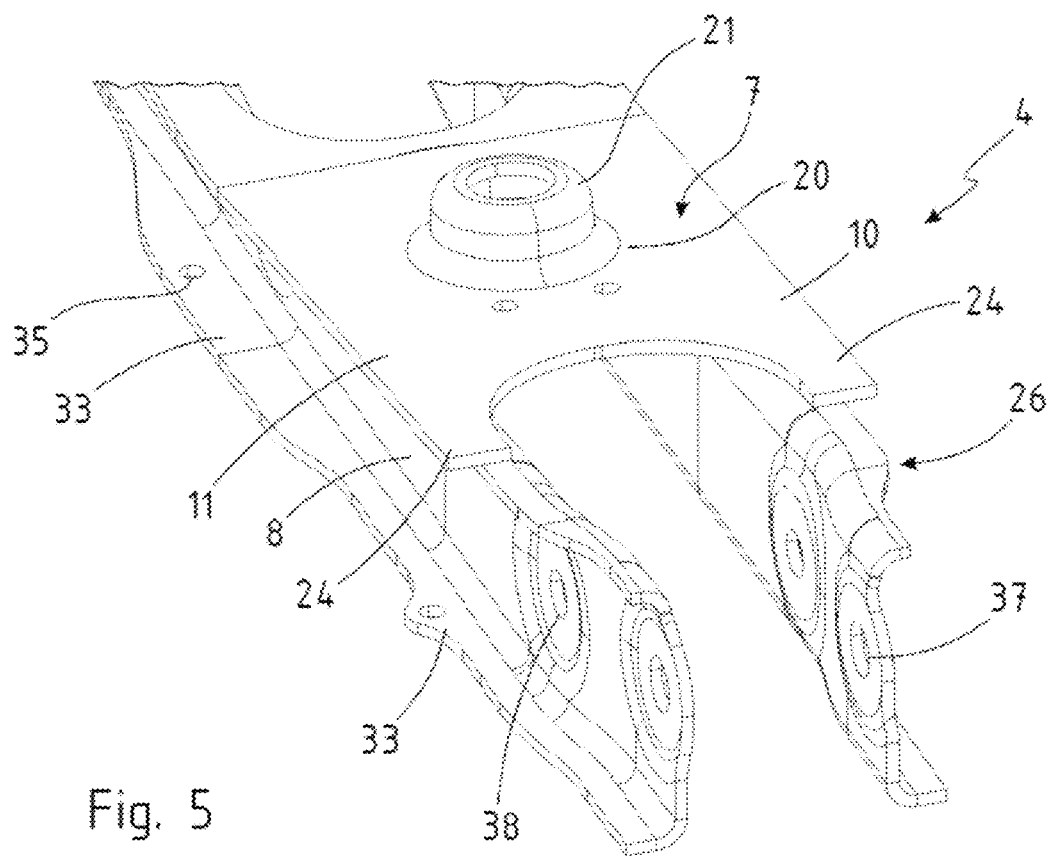
FIG. 5 shows a section of the spring link with the representation of the bearing section of the link body on the vehicle body side.

In the Figures, the same reference numerals are used for identical and similar components, even if a repeated listing is omitted for reasons of simplicity.

A spring link 1 according to the disclosure is described with reference to FIG. 1 to FIG. 5.

A coordinate system is shown in FIG. 1 in order to define the position of the individual components in the construction of the spring link 1. The x-axis corresponds to the spring link longitudinal axis, the y-axis corresponds to the spring link transverse axis, and the z-axis corresponds to the spring link vertical axis.

The spring link 1 has a link body 2, which includes a bearing section 3 on the wheel carrier side and a bearing section 4 on the vehicle body side.

The link body 2 consists of two side wall profiles 5, 6, which are connected by an upper spring seat plate 7.

The side wall profiles 5, 6 of the link body 2 are designed to be mirror-symmetrical to one another. The side wall profiles 5, 6 and the spring seat plate 7 include a high-strength steel material.

Each side wall profile 5, 6 includes a side web 8 having an outwardly directed upper collar section 9 which extends in the longitudinal direction L of the side web 8. The side wall profiles 5, 6 are arranged parallel to one another at a distance in the y-axis. The spring seat plate 7 rests with lateral longitudinal edge sections 10, 11 on an upper collar section 9 of a side wall profile 5, 6. The spring seat plate 7 and the side wall profiles 5, 6 or upper collar sections 9 are materially bonded to one another.

The upper collar sections 9 are repositioned or directed outwards from the side web 8 in the spring link transverse axis (y-axis).

The upper collar sections 9, which extend along the upper side edges 12 of the side web 8, extend over the entire length of a side wall profile 5, 6. The collar sections 9 are directed outwards in relation to the vertical central longitudinal plane VMLE of the link body 2. The vertical central longitudinal plane VMLE also forms the plane of symmetry of the side wall profiles 5, 6.

The link body 2 consists of three components, namely the two side wall profiles 5, 6 arranged parallel to one another at a distance and the spring seat plate 7 which extends transversely between the side wall profiles 5, 6 and connects the side wall profiles 5, 6.

The lower side 13 of the link body 2 opposite to the spring seat plate 7 is open.

Each side web 8 of a side wall profile 5, 6 includes an outwardly directed lower collar section 14 which extends in the longitudinal direction L of the side web 8. The lower collar sections 14 extend on the lower side edge 15 of the side web 8 over the length of a side wall profile 5, 6.

The upper collar section 9 and the lower collar section 14 of a side wall profile 5, 6 merge into one another at a first front end 16 of the side wall profiles 5, 6 via an arced collar section 17. In this way, the upper collar section 9, the arced collar section 17, and the lower collar section 14 form an outwardly directed edge 18 which is continuous on three sides of a side wall profile 5, 6.

The longitudinal edge sections 10, 11 of the spring seat plate 7 rest on the upper collar sections 9 and are joined thereto. Laterally, the longitudinal edge sections 10, 11 of the spring seat plate 7 protrude beyond the outer edges 19 of the collar sections 9.

The spring seat plate 7 includes a bulge 21 that protrudes relative to a spring support surface 20. The bulge 21 is used as a centering and bearing orientation for a helical compression spring positioned on the spring support surface 20.

The spring support surface 20 forming a spring seat lies above the side wall profiles 5, 6.

The spring seat plate 7 includes an arced contoured recess 23 on its two end faces 22, each extending transversely between the side wall profiles 5, 6. The recess 23 is used to pass through add-on components such as stabilizers and shock absorber legs.

Due to the recess 23, the end faces 22 of the spring seat plate 7 are forked or U-shaped having flange webs 24 extending in the longitudinal direction L of the side wall profiles 5, 6 and resting on the upper collar sections 9.

The side wall profiles 5, 6 each include a first end section 25 on the wheel carrier side and a second end section 26 on the vehicle body side.

In the bearing section 3 of the link body 2 on the wheel carrier side, two non-round openings 27 and 28 are provided in each of the first end sections 25 of the side wall profiles 5, 6. The first non-round opening 27 is an elongated hole. The second non-circular opening 28 has a trapezoidal configuration. The second non-round opening 28 is positioned on the side of the first opening 27 directed away from the front end 16 of the side wall profiles 5, 6. At the non-circular opening 28 having a trapezoidal configuration, an edge stop 29 is formed by a circumferential collar 30. The collar 30 is directed outward. The collar 30 therefore extends oriented in the same direction as the upper collar section 9 and the lower collar section 14 as well as the arced collar section 17.

Figure 6:
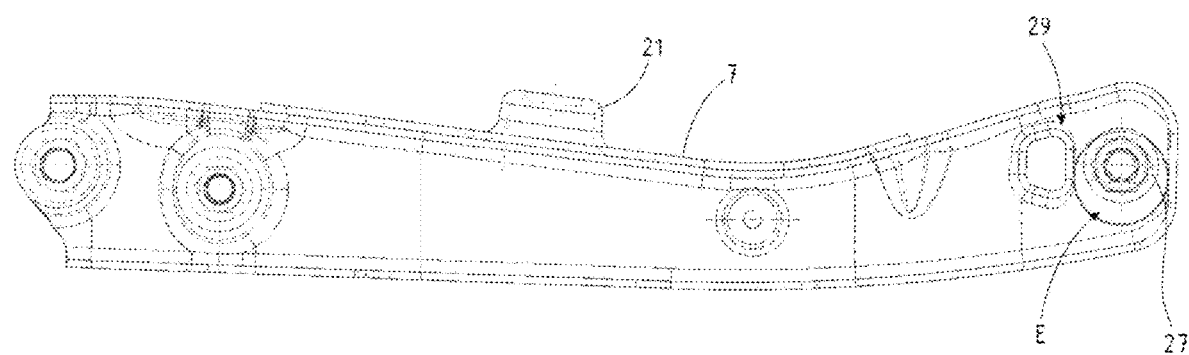
FIG. 6 shows the eccentric adjustment device.

The non-round openings 27, 28 which are opposite to one another in the side wall profiles 5, 6 are arranged coaxially with one another. The two openings 27, 28 are configured and intended to cooperate with an eccentric adjustment device, as seen at E in FIG. 6. The eccentric adjustment device 5 comprises actuating elements having cylindrical connecting elements which are guided through the openings 27, 28. By means of the eccentric adjustment device, the location and position of the bearing section 3 on the wheel carrier side can be adjusted relative to a wheel carrier.

Inwards in the direction toward the spring seat plate 7, adjacent to the non-round openings 28, a bead 31 is provided in the first end section 25 of a side wall profile 5, 6. The bead 31 is formed in the transition 32 from the upper collar section 9 to the side web 8. The bead 31 extends in a triangular shape, directed downwards in the side web 8 to approximately its middle.

The lower collar section 14 includes sections 33, 34 having different widths over its longitudinal course. In the middle sections 34, the collar section 14 is made wider than in the area of the end sections 25 and 26.

Mounting holes 35 are provided in the lower collar sections 14. A stone chip protection is able to be fastened on the mounting openings 35. Here, the wider sections 34 of the lower collar section 14 function as a flange for assembly.

The upper collar sections 9 also have a different width in their longitudinal course. In the middle longitudinal area, the upper collar sections 9 have the greatest width. The upper collar sections 9 taper towards the front end 16 and the arced collar section 17. In the second end section 26, the upper collar sections 9 also taper towards the free end 36.

In the link body 2 or the side wall profiles 5, 6, bearing openings 37 for mounting a rubber bearing, bearing openings 38 for connecting stabilizer elements, and bearing openings 39 for connecting a shock absorber are also provided.

The spring link 1 is completed by bearing components (not shown in the figures) and bearing or connection components for, for example, a rubber-metal bearing, stabilizers, a shock absorber, and a wheel carrier fastening, which includes an eccentric adjustment device.

The two side wall profiles 5, 6, which are arranged at a distance from one another, are directly connected by the spring seat plate 7. Otherwise, a connection between the two side wall profiles 5, 6 is established indirectly via bearing components and/or connection components which are mounted on the bearing openings 37, 38, 39.

The invention claimed is:

1. A spring link comprising:
    a link body including two side wall profiles connected by a spring seat plate, wherein each of the two side wall profiles includes a side web having an outwardly directed upper collar section extending in a longitudinal direction of the side web and an outwardly directed lower collar section extending in the longitudinal direction of the side web and each of the two side wall profiles includes a first end section and a second end section,
    wherein a beading is in at least one end section, said beading is formed in the transition from the outwardly directed upper collar section to the side web, the beading faces inwardly in toward the spring seat plate, and the beading extends in a triangular shape directed downwards in the side web, and the spring seat plate includes two lateral longitudinal edge sections, wherein each lateral longitudinal edge section resting on and joined to a respective outwardly directed upper collar section.

2. The spring link according to claim 1, wherein each of the two side wall profiles are mirror-symmetrical to one another.

3. The spring link according to claim 1, wherein a lower side of the link body opposite to the spring seat plate is open.

4. The spring link according to claim 1, wherein the outwardly directed upper collar sections each extend over a length of each of the two side wall profiles.

5. The spring link according to claim 1, wherein the outwardly directed lower collar sections each extend over a length of each of the two side wall profiles.

6. The spring link according to claim 1, wherein the outwardly directed upper collar sections and the outwardly directed lower collar sections of each of the two side wall profiles merge into one another at a first front end of each of the two side wall profiles via an arcuate extending collar section.

7. The spring link according to claim 1, wherein the lateral longitudinal edge section of the spring seat plate protrudes laterally outwards over the outwardly directed upper collar sections.

8. The spring link according to claim 1, wherein the spring seat plate includes a bulge projecting relative to a spring support surface.

9. The spring link according to claim 1, wherein the spring seat plate includes an arced contoured recess in an end face extending transversely between each of the two side wall profiles.

10. The spring link according to claim 1, wherein at least one non-round opening is in each first end section of each of the two side wall profiles, wherein the at least one non-round opening in each of the two side wall profiles are arranged coaxially with one another and configured to cooperate with an eccentric adjustment device.

11. The spring link according to claim 10, wherein an edge stop is at the at least one non-round opening.

12. The spring link according to claim 11, wherein the edge stop is formed by a circumferential collar on the at least one non-round opening.

13. The spring link according to claim 1, wherein the outwardly directed lower collar section includes sections of different widths in the longitudinal direction, wherein the outwardly directed lower collar section is wider in a middle section that in the first or second end section.

14. The spring link according to claim 1, wherein the outwardly directed upper collar sections have a different width in the longitudinal direction, wherein the outwardly directed upper collar sections have the greatest width in a middle length area.

* * * * *